A. J. BUCKLEY.
SEPARATING MACHINE.
APPLICATION FILED FEB. 8, 1917.
1,239,561.
Patented Sept. 11, 1917.
2 SHEETS—SHEET 1.
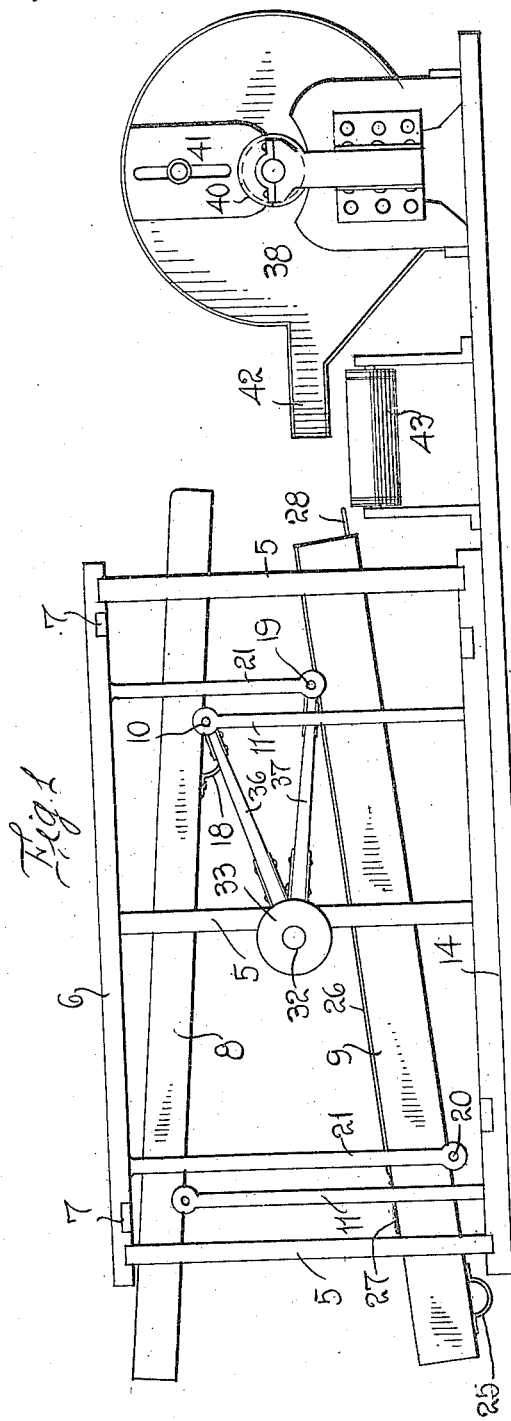
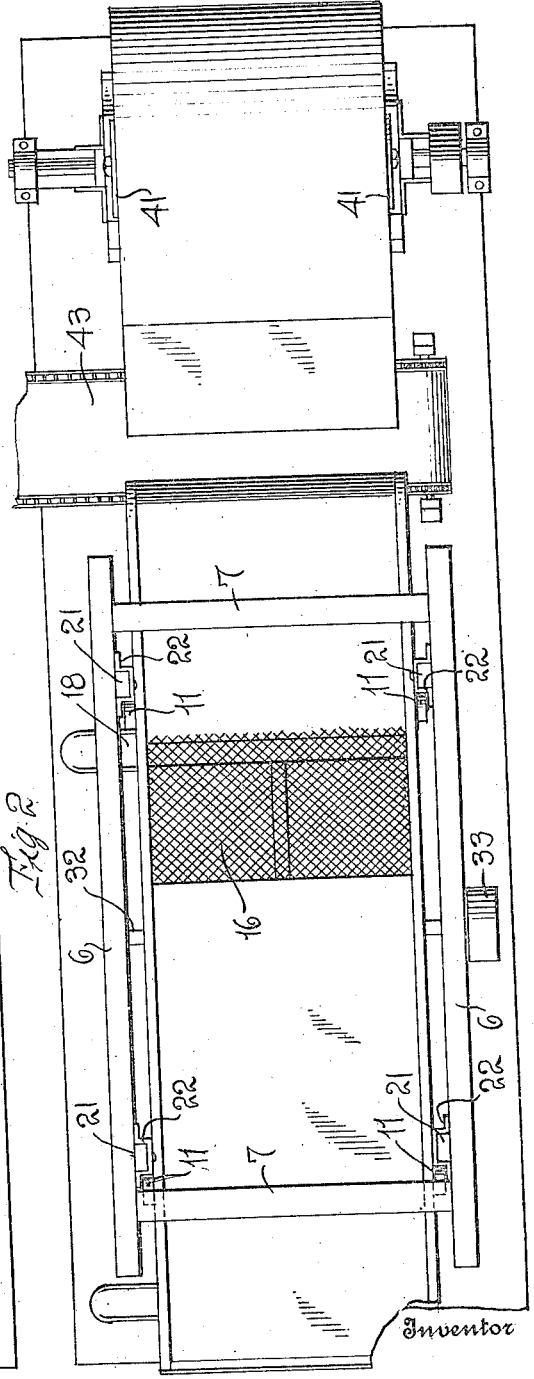
Inventor
A. J. BUCKLEY
By Watson E. Coleman
Attorney

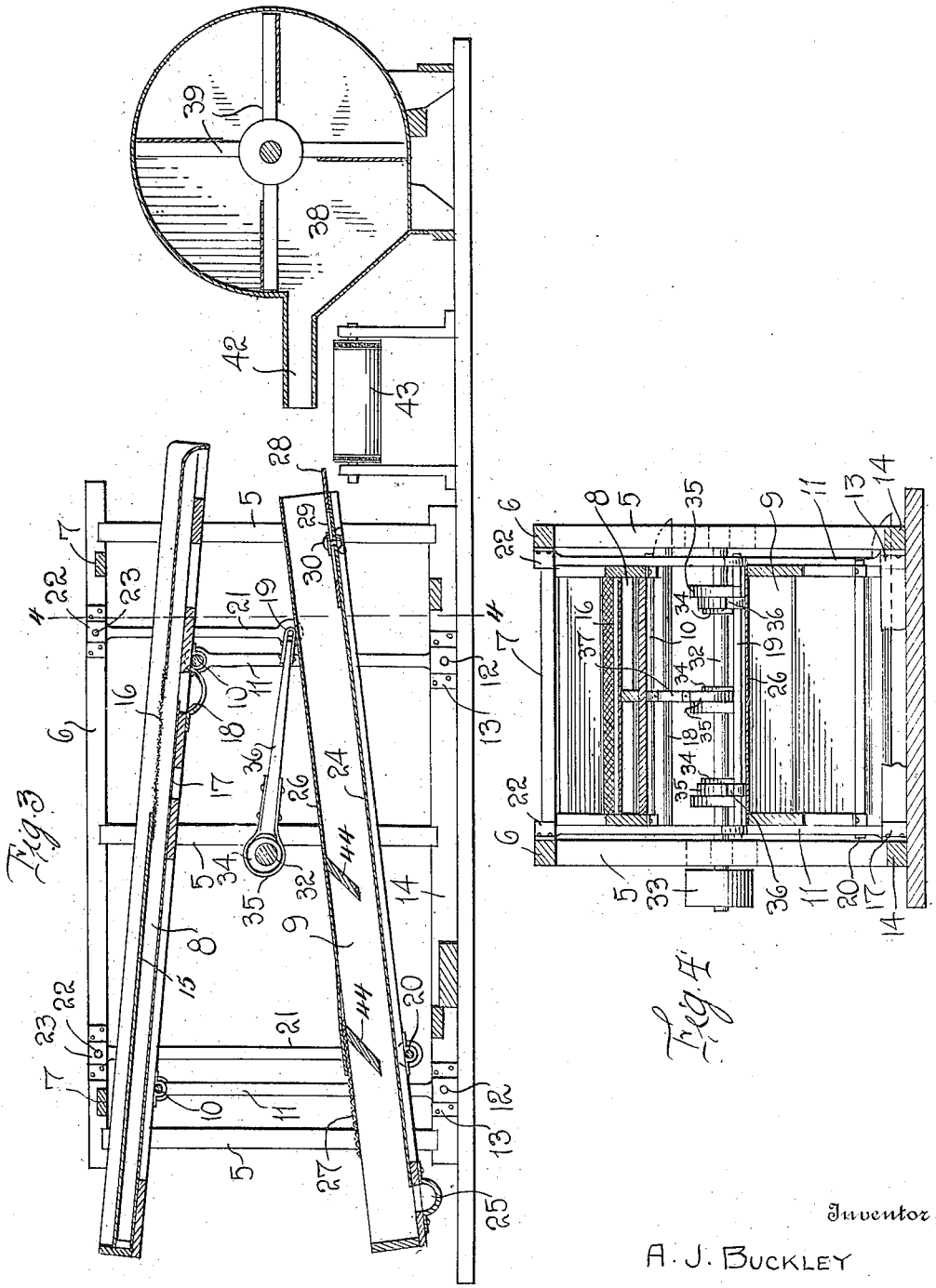

UNITED STATES PATENT OFFICE.

ANDREW JACKSON BUCKLEY, OF CALVERT, TEXAS.

SEPARATING-MACHINE.

1,239,561.

Specification of Letters Patent. Patented Sept. 11, 1917.

Application filed February 8, 1917. Serial No. 147,410.

*To all whom it may concern:*

Be it known that I, ANDREW J. BUCKLEY, a citizen of the United States, residing at Calvert, in the county of Robertson and State of Texas, have invented certain new and useful Improvements in Separating-Machines, of which the following is a specification, reference being had to the accompanying drawings.

This invention relates to a machine for separating hulls and other foreign matter from seed meats, and has for its primary object to provide a simply constructed and efficient machine of this character which is particularly designed for facilitating the separation of hulls, fiber, and lint from cotton seed meats.

In a generic sense, the present invention aims to effect the separation of the foreign materials from the seed meats by means of an air blast directed against the materials as they fall by gravity from an inclined shaker or agitator, the lighter foreign matter being thereby separated from the heavier seed meats which continue their descent to a suitable conveyer or receptacle.

It is a more particular object of the invention to provide in a machine of the above character, superposed pans arranged in relatively opposite, inclined planes, means for shaking or agitating the pans, the lower pan receiving the hulls or foreign matter and being provided with means to direct the light lint or fiber into the moving mass of seed hulls to be finally discharged therewith from the pan.

It is another one of the detail objects of the invention to provide means in the upper inclined pan for sifting the fine dirt and other foreign matter from the mixed seed and hulls as they gravitate downwardly over the pan floor.

And the invention has for a further general object to improve and simplify the construction of machines for the above purpose and reduce their manufacturing cost to a minimum.

With the above and other objects in view, my invention consists in the novel features of construction, combination and arrangement of parts to be hereinafter more fully described, claimed and illustrated in the accompanying drawings, in which, Figure 1 is a side elevation of a machine illustrating the preferred embodiment of my invention;

Fig. 2 is a top plan view, parts of the shaker pans being broken away;

Fig. 3 is a longitudinal sectional view through the machine; and

Fig. 4 is a section taken on the line 4—4 of Fig. 3.

Referring in detail to the drawings, 5 designates two series of vertical posts or uprights, the uprights in each series being connected at their upper ends by means of the longitudinal bars 6 and said bars in turn being connected together, adjacent their opposite ends, by the transverse bars 7. Between the two series of uprights 5, the upper and lower shaking or agitating pans 8 and 9 respectively, are arranged. The pan 8 has transverse rods 10 secured to its under side in spaced relation to its opposite ends, the terminals of these rods being mounted in the upper ends of the vertically disposed spring metal bars 11 which are securely fixed at their lower ends by means of the pins or bolts 12 in the brackets 13. These brackets are suitably fixed to longitudinal floor beams or sills 14. The floor 15 of the pan 8 is provided with an opening therein, intermediate of its ends and extending the entire width of the floor, said opening being covered by a sheet of fine wire gauze or other reticulated material 16. It will be noted that the pan 8 is supported upon the upper ends of the bars 11 in a longitudinally inclined plane. Beneath the opening in the floor of the pan and suitably fixed to the opposite side bars of the pan, a plate 17 is disposed, one edge of said plate disposed toward the lower end of the pan being spaced from the corresponding edge of the opening in the pan floor. To this latter edge of the plate 17 and the bottom of the pan, a receiving trough or spout 18 is secured. This trough receives the finely comminuted or pulverized seed meats which sift through the wire screen 16.

The lower pan 9 is of somewhat greater depth than the pan 8 and is also longitudinally inclined but in the reverse direction to the pan 8. A transversely disposed rod 19 extends across the upper side of the pan, adjacent its higher end, and a similar rod 20 across the lower or bottom side of the pan adjacent its lower end. The ends of these rods are engaged in the lower ends of bars 21, the upper ends of which are disposed in the rectangular brackets 22 secured to the inner sides of the longitudinal frame bars 6. These hanger bars are of springy or resilient metal and are securely fixed within the brackets 22 at their upper ends by means of the bolts 23. The bars 11 are formed of similar resilient metal. The bottom wall 24 of the pan 9 is preferably of metal and extends the entire length thereof. At the lower end of the pan, this wall is downwardly bent or curved to form a transversely disposed trough 25. The pan is also provided with an imperforate top wall 26 extending for the major portion of the length thereof and terminating in spaced relation to the lower end of the pan. Beyond this lower end of the top wall 26, a transversely disposed strip or sheet of reticulated material 27 is secured to the upper edges of the side walls of the pan, said strip being, however, spaced from the adjacent end wall of the pan to leave an open space above the trough 25. At the upper end of the pan 9, a longitudinally adjustable plate 28 is mounted upon the bottom wall of the pan, said plate extending the entire width of the pan and being provided adjacent its opposite ends with longitudinal slots 29 to receive the bolts 30 extending through the pan wall and provided upon their lower ends with clamping nuts 31. By loosening the nuts, it will be understood that this plate can be readily shifted to project to any desired extent beyond the end of the pan wall.

Upon the intermediate posts or uprights 5 between the pans 8 and 9, a transversely disposed shaft 32 is mounted in suitable bearings, a belt wheel 33 being fixed upon one end of said shaft. Spaced eccentrics 34 are also secured upon this shaft to coöperate with the straps 35 fixed upon the ends of the connecting rods or bars 36 and 37 respectively. The rod 36 which is connected to the central eccentric on the shaft 32, has its other end attached to one of the rods 10 on the under side of the pan 8. The other two connecting rods 37 are connected in a similar manner to the rod 19 on the lower pan 9. The extent of longitudinal movement of the inclined pans is, of course, determined by the throw of the eccentrics 34 where the resilient bars 11 and 21 at all times act to return the pans to their normal positions against the operation of the eccentrics. Thus, the pans are shaken or jarred to facilitate the movement of the material over the pan floor.

In spaced relation to the contiguous ends of the inclined pans 8 and 9, a fan casing or housing 38 is mounted, within which a suitable blast fan 39 operates. The air intake opening 40 at one end of the casing is adapted to be closed to a greater or less extent to regulate the air supply by means of a sliding plate 41 which is mounted upon the casing wall. The side of the casing opposed to the agitating or shaking pans is provided with a laterally extending outlet mouth 42. This outlet mouth for the air blast, which is relatively narrow, is in a direct line with the lower pan 9 and in opposed relation to its upper open end.

Beneath this outlet mouth of the fan casing and between the same and the end of the pan 9, a conveyer or other suitable receptacle, indicated at 43, is mounted.

In cotton seed oil mills, the seed is passed through a huller which breaks up the seed and exposes the meats. The mixed hull and meats are then fed in any suitable manner to the pan 8, and as this pan is shaken or agitated, any seed meat and hulls gravitate downwardly over the floor thereof. In passing over the reticulated screen or sieve 16, any fine particles of the seed meats sift through the same and are carried off by the trough 18. The mixed seed meat and hulls finally drop from the lower end of the pan 8 and fall downwardly across the outlet mouth of the fan casing. The air blast issuing from the mouth of the fan casing strikes the falling materials and carries off or separates the light hulls, lint, and fiber from the seed meats, directing the former into the open upper end of the lower pan 9. The heavier seed meats continue to fall downwardly and are caught by the conveyer or receptacle 43. The plate 28 is adjusted toward or from the mouth 42 of the fan casing in accordance with the weight of the falling materials and the pressure of the air against the same so that the hulls and lint will, under varying circumstances, be received into the upper end of the pan 9. In the agitation of this pan, the hull and lint and particles of fiber move downwardly over the floor thereof. Transversely disposed, inclined baffle plates 44 are secured between the side walls of this pan above and in spaced relation to its floor, and direct the light particles of lint and fiber downwardly into the moving mass of seed hulls so that the whole will be finally discharged into the trough 25, the air finding an outlet in an upward direction through the wire screen 27 and the open end of the pan. In this manner, it will be seen that a thorough separation of the hulls and fiber from the seed meats is effected by means of a blast or current of air. The machine may be employed for operating in a like manner upon other seed meats than cotton seed, as will be readily understood. The agitating pans 8 and 9 may be made of any desired capacities, and the several other parts of the machine, as above described may also be variously modified in many minor respects, and I, therefore, reserve the privilege of adopting all such legitimate changes as may be fairly embodied within the spirit and scope of the invention as claimed.

Having thus fully described my invention, what I desire to claim and secure by Letters Patent is:

1. In a machine of the character described, upper and lower shaker pans disposed in reversed, longitudinally inclined planes, means for mounting the pans for limited longitudinal reciprocating movement, whereby said pans are brought to an abrupt stop at the end of their movement in each direction, means for reciprocating said pans, the material moving by gravity from the upper pan and falling from one end thereof across the corresponding end of the lower pan, and means to discharge an air blast against the falling material to separate the lighter foreign matter therefrom and direct the same into the lower pan.

2. In a machine of the character described, upper and lower pans arranged in reversely inclined planes, said lower pan having a top wall and being open at one end, the material moving by gravity and falling from the upper pan across the open end of the lower pan, and a blast fan to discharge an air blast against the falling material and separate the lighter particles of foreign matter therefrom and direct the latter into the open end of the lower pan.

3. In a machine of the character described, upper and lower longitudinal pans disposed in reversely inclined planes, a screen arranged in the floor of the upper pan, a conducting trough to receive foreign matter sifting from the material through said screen, the lower pan having a top wall and being open at its higher end, the material falling by gravity from the lower end of the upper pan across the upper end of said lower pan, and means for discharging an air blast against the material at right angles to its direction of gravity movement to separate the lighter particles of foreign material therefrom and direct the same into the open end of the lower pan.

4. In a machine of the character described, upper and lower longitudinal pans disposed in reversely inclined planes, the lower pan having a top wall and being open at its higher end, the material falling by gravity from the lower end of the upper pan across the upper end of said lower pan, means for discharging an air blast against the material at right angles to its direction of gravity movement to separate the lighter particles of foreign material therefrom and direct the same into the open end of the lower pan, said lower pan having a transversely disposed, discharge trough at its lower end, and spaced, transverse, baffle plates arranged in said pan to direct the material against the bottom wall of the pan for gravity movement thereover into the discharge trough.

5. In a machine of the character described, upper and lower longitudinal pans disposed in reversely inclined planes, the lower pan having a top wall and being open at its higher end, the material falling by gravity from the lower end of the upper pan across the upper end of said lower pan, means for discharging an air blast against the material at right angles to its direction of gravity movement to separate the lighter particles of foreign material therefrom and direct the same into the open end of the lower pan, said lower pan having a transversely disposed, discharge trough at its lower end, spaced, transverse, baffle plates arranged in said pan to direct the material against the bottom wall of the pan for gravity movement thereover into the discharge trough, and means for longitudinally reciprocating said pans.

6. In a machine of the character described, spaced upper and lower agitating pans, the material dropping by gravity from the end of the upper pan across the end of the lower pan, supporting means for the pans yieldingly holding the same in their normal positions against relative movement, means operatively connected to the pans to reciprocate the same with respect to each other, and a blast fan to discharge the air blast against the falling material and separate the lighter particles of foreign matter therefrom and direct the latter into the lower pan.

7. In a machine of the character described, spaced upper and lower agitating pans arranged in reversely inclined planes, the material dropping by gravity from one end of the upper pan across the end of the lower pan, resilient supporting bars for each of the pans yieldingly holding the same in their normal positions and against relative movement, means operatively connected to the said pans to reciprocate the same longitudinally with respect to each other, and a blast fan to discharge an air blast against the falling material and separate the lighter particles of foreign matter therefrom and direct the latter into the lower pan.

8. In a machine of the character described, a longitudinally reciprocable pan, means for reciprocating said pan, means for feeding material by gravity across and in spaced relation to one end of the pan, and means for directing a blast of air upon the material in its gravity movement to separate the lighter particles of foreign matter therefrom and direct the latter into said reciprocating pan.

9. In a machine of the character described, a longitudinally reciprocable pan, means for reciprocating said pan, means for yieldingly retarding the reciprocatory movement of the pan in each direction, means for feeding material by gravity across one end of the pan, and means for directing a blast of air upon the material in its gravity movement to separate the lighter particles of foreign matter therefrom and direct the latter into said reciprocating pan.

10. In a machine of the character described, spaced upper and lower pans, one end of the upper pan projecting beyond the corresponding end of the lower pan, the material dropping from the projecting end of the upper pan across and beyond the end of the lower pan, means for reciprocating said pans with respect to each other, and means for directing an air blast against the falling material to separate the lighter particles of foreign matter therefrom and direct the latter into the lower pan.

In testimony whereof I hereunto affix my signature in the presence of two witnesses.

ANDREW JACKSON BUCKLEY.

Witnesses:
J. S. LONG,
J. M. BROADRICK.

Copies of this patent may be obtained for five cents each, by addressing the "Commissioner of Patents, Washington, D. C."